(12) United States Patent
Hioki et al.

(10) Patent No.: US 8,686,833 B2
(45) Date of Patent: Apr. 1, 2014

(54) CONTROL SYSTEM INCLUDING ELECTRONIC CONTROL APPARATUS AND SENSOR APPARATUSES BUS-CONNECTED TO ELECTRONIC CONTROL APPARATUS

(75) Inventors: Toshikazu Hioki, Kariya (JP); Housyo Yukawa, Obu (JP); Masayuki Kaneko, Kariya (JP); Fumitaka Sugimoto, Okazaki (JP); Hirohumi Isomura, Kariya (JP)

(73) Assignee: Denso Corporation, Kariya (JP)

( * ) Notice: Subject to any disclaimer, the term of this patent is extended or adjusted under 35 U.S.C. 154(b) by 443 days.

(21) Appl. No.: 13/164,953

(22) Filed: Jun. 21, 2011

(65) Prior Publication Data
US 2011/0313640 A1 Dec. 22, 2011

(30) Foreign Application Priority Data
Jun. 21, 2010 (JP) .................. 2010-140619

(51) Int. Cl.
- G08B 1/08 (2006.01)
- H04Q 1/30 (2006.01)
- H04L 12/40 (2006.01)

(52) U.S. Cl.
USPC ............ 340/10.1; 340/2.1; 340/2.4; 340/2.8; 340/533; 340/534; 370/438; 370/439

(58) Field of Classification Search
USPC ........ 340/518, 524, 2.1, 2.4, 2.8, 10.31, 12.1, 340/3.54, 533–538.17; 370/533–538.17, 370/438, 439
See application file for complete search history.

(56) References Cited

U.S. PATENT DOCUMENTS

| 5,404,137 A * | 4/1995 | Levien ........................ 340/3.9 |
| 2008/0059038 A1 | 3/2008 | Yoshida et al. |
| 2010/0161080 A1 * | 6/2010 | Hioki et al. .................... 700/12 |

FOREIGN PATENT DOCUMENTS

| JP | 8-65756 | 3/1996 |
| JP | 2008-57413 | 3/2008 |
| JP | 2010-144692 | 7/2010 |

* cited by examiner

Primary Examiner — Daniel Wu
Assistant Examiner — John Bamert
(74) Attorney, Agent, or Firm — Nixon & Vanderhye PC (57) ABSTRACT

The control system has a structure in which sensor apparatuses each having a data communication function are connected to an electronic control apparatus through a common communication line, and the sensors of the sensor apparatuses are connected to the electronic control apparatus through separate individual signal lines to transmit sensor signals to the electronic control apparatus. The electronic control apparatus is configured to, prior to transmitting communication data to one of the sensor apparatuses through the communication line, set the signal line connected to the selected sensor apparatus in a state in which the voltage of the signal line is outside a variation range corresponding to a voltage range of the sensor signal, and set the signal lines connected to the other sensor apparatuses to each of which the communication data is not addressed in a state in which the voltage of the signal line is within the variation range.

13 Claims, 7 Drawing Sheets

CONTROL SYSTEM INCLUDING ELECTRONIC CONTROL APPARATUS AND SENSOR APPARATUSES BUS-CONNECTED TO ELECTRONIC CONTROL APPARATUS

This application claims priority to Japanese Patent Application No. 2010-140619 filed on Jun. 21, 2010, the entire contents of which are hereby incorporated by reference.

BACKGROUND OF THE INVENTION

1. Field of the Invention

The present invention relates to a control system including an electronic control apparatus and a plurality of sensor devices each having a communication function and connected to the control system, the sensor device with a communication function, and the electronic control apparatus.

2. Description of Related Art

There are known drive apparatuses incorporating a sensor and an actuator. As such a drive apparatus, there is one incorporating a memory to store its characteristic values. For example refer to Japanese Paten Application Laid-open No. 2008-057413. Initial characteristic values are written into the memory of the drive apparatus at the time of shipment thereof, so that an electronic control unit (ECU) can control the drive apparatus based on the initial characteristic value.

Further, there is known a technique in which learned values acquired through control by an electronic control apparatus are written into a memory incorporated in a drive apparatus in order to prevent the learned values from being lost when the electronic control apparatus is repaired or replaced.

Incidentally, to adopt such a technique for such a drive apparatus incorporating a memory, it is necessary to provide the drive apparatus with a communication function enabling the electronic control apparatus to read initial characteristic values from the drive apparatus or write learned values into the drive apparatus. Generally, it is possible to communicably connect a plurality of drive apparatuses to an electronic control unit through respective separate communication lines, if the electronic control unit is provided with communication devices dedicated to the respective drive apparatuses. However, it is desirable to connect the plurality of the drive apparatuses to the electronic control apparatus through a common communication line used as a bus.

To adopt such a bus connection, it is necessary to assign the respective drive apparatuses with different node IDs, so that communication can be performed between the electronic control apparatus and each of the drive apparatuses using the node IDs. However, in this case, a problem may occur as described below. Let's consider an example in which injectors of the respective cylinders of an engine are connected as drive apparatuses to an electronic control apparatus. As is well known, fuel injection control is performed such that injection signals outputted from the electronic control apparatus are inputted to an electronic driver apparatus (EDU), and the electronic driver apparatus drives the injectors based on the injection signals. That is, the fuel injection control is performed independently of memory access from the electronic control apparatus to the injectors through the communication line.

Here, it is assumed that the injector assigned with a node ID of 2 is erroneously mounted on the first cylinder although it should be mounted on the second cylinder, and the injector assigned with a node ID of 1 is erroneously mounted on the second cylinder although it should be mounted on the first cylinder.

In this case, since the electronic control apparatus erroneously reads the characteristic values from the injector mounted on the second cylinder as the characteristic values of the injector of the first cylinder, fuel injection control cannot be performed correctly.

Figure 1:
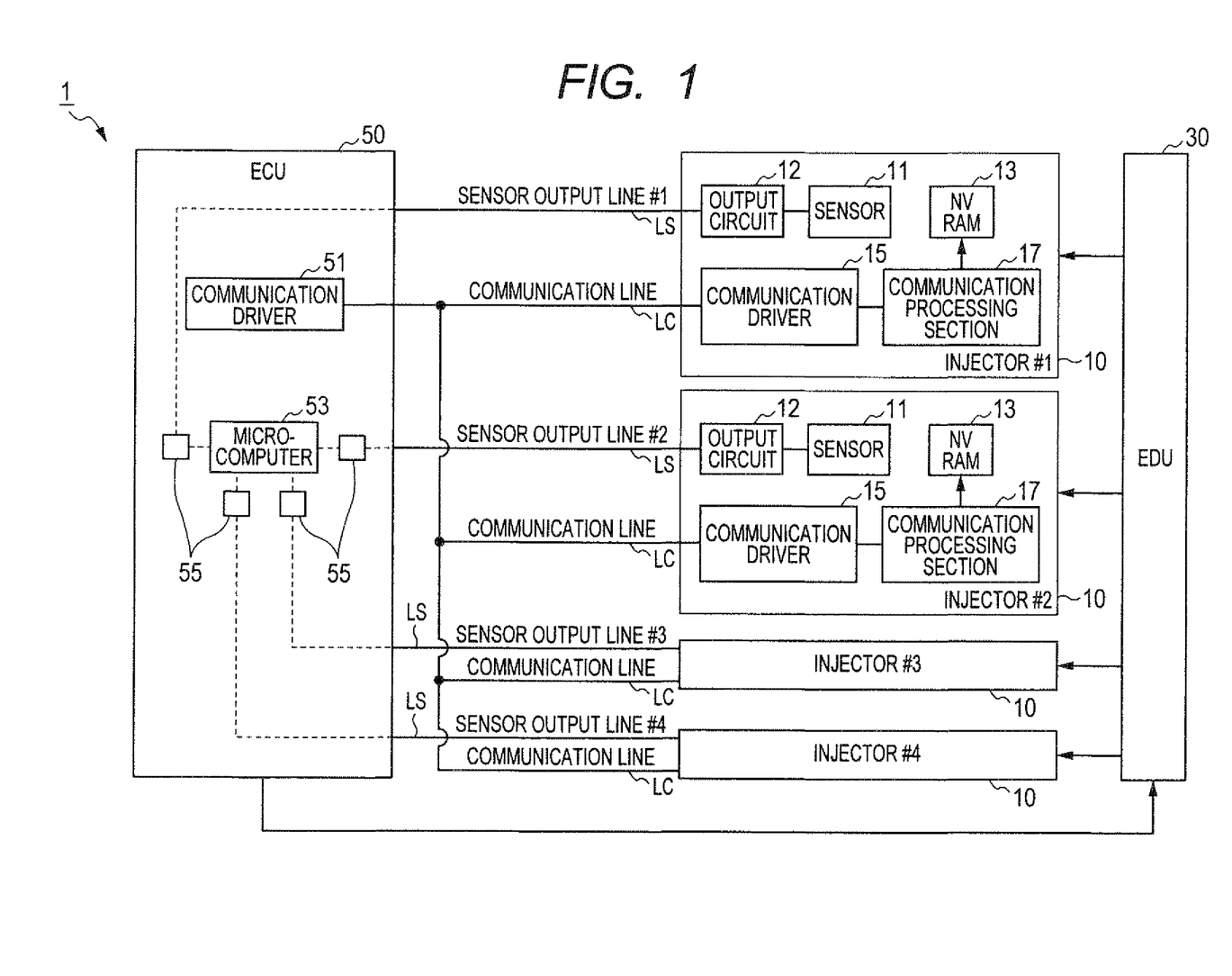
FIG. 1 is a block diagram showing the overall structure of an injector drive system as a first embodiment of the invention.

A similar problem may occur in a case where analog sensor signals (analog output signals of sensors) are inputted to a electronic control apparatus through respective signal lines (sensor output lines) provided for respective drive apparatuses without through a communication line as shown in FIG. 1. In this case, the connection relationship between the sensors respectively incorporated in the drive apparatuses and the electronic control apparatus is determined physically by the sensor output lines, however, the connection relationship between the memories respectively incorporated in the drive apparatuses and the electronic control unit is determined logically by the node IDs assigned to the drive apparatuses.

Accordingly, if the sensor of the drive apparatus assigned with the node ID of 2 is erroneously connected to a first sensor output line although it should be connected to a second sensor output line, and the sensor of the drive apparatus assigned with the node ID of 1 is erroneously connected to the second sensor output line although it should be connected to the first signal line, the electronic control apparatus erroneously compensates the sensor signal from the drive apparatus having the node ID of 2 received through the first sensor output line, in accordance with the characteristic values of the drive apparatus having the node ID of 1 received through the communication line.

SUMMARY OF THE INVENTION

An embodiment provides a control system comprising:

a plurality of sensor apparatuses each including a sensor, an output circuit connected to the sensor, and a communication device; and an electronic control apparatus to which the communication devices of the sensor apparatuses are connected through a common communication line to enable data communication between the electronic control unit and each of the sensor apparatuses, the electronic control apparatus being connected to signal lines respectively connected to the output circuits of the sensor apparatuses to enable receiving sensor signals respectively outputted from the sensor apparatuses, the electronic control apparatus including a transmission control means configured to, prior to transmitting communication data to one of the sensor apparatuses, set the signal lines connected to the other sensor apparatuses to which the communication data is not addressed to an enabled state in which the sensor signal is allowed to be transmitted, and set the signal line connected to the one of the sensor apparatus to which the communication data is addressed to a disabled state in which the sensor signal is inhibited from being transmitted, each of the sensor apparatuses including a determination means to determine whether or not the signal line connected to the own sensor apparatus is in the disabled state based on an operation state of the output circuit of the own sensor apparatus, and a reception control means configured to accept the communication data received in the communication device to perform an operation in accordance with the accepted communication data when the signal line connected to the own sensor apparatus is determined to be in the disabled state by the determination means, and discard the received communication data when the signal line connected to the own sensor apparatus is determined to be in the enabled state by the determination means.

Another embodiment provides a sensor apparatus having a communication function comprising:

a sensor;

a communication device to perform data communication with an external apparatus through a communication line;

an output circuit to transmit a sensor signal outputted from the sensor to the external apparatus through a signal line;

a determination means to determine whether the signal line is in a disabled state where the sensor signal is inhibited from being transmitted on the signal line or an enabled state where the sensor signal is allowed to be transmitted on the signal line; and a reception control means configured to accept communication data received in the communication device when the signal line is determined to be in the disabled state by the determination means to perform an operation in accordance with the received communication data, and to discard the received communication data when the signal line is determined to be in the enabled state by the determination means.

Another embodiment provides an electronic control apparatus having a communication function to communicate with a plurality of sensor apparatuses each including a sensor and a communication device, comprising:

input circuits to receive sensor signals outputted from the sensors of the sensor apparatuses through signal lines respectively connected between the input circuits and the sensor apparatuses; a communication device to perform data communication with the sensor apparatuses through a common communication line; and a transmission control section configured to, prior to transmitting communication data to a selected one of the sensor apparatuses to which the communication data is addressed, set the signal line connected to the selected sensor apparatus in a first state in which a voltage of the signal line is outside a variation range corresponding to a voltage range of the sensor signal, and set the signal lines connected to the other sensor apparatuses to each of which the communication data is not addressed in a second state in which the voltage of the signal line is within the variation range.

According to the present invention, there is provided a control system having a structure in which a plurality of sensor apparatuses each having a data communication function are bus-connected to an electronic control apparatus, and the sensors of the sensor apparatuses are connected to the electronic control apparatus through separate individual signal lines, and being capable of performing control correctly even if the sensor apparatuses are mis-connected to the signal lines to one another.

Other advantages and features of the invention will become apparent from the following description including the drawings and claims.

PREFERRED EMBODIMENTS OF THE INVENTION

FIG. 1 is a block diagram showing the overall structure of an injector drive system 1 as an embodiment of the invention. The injector drive system 1, which is mounted on a vehicle with a 4-cylinder engine, includes injectors 10 provided for respective cylinders of the engine, an electronic driver apparatus (EDU) 30 to drive the injectors 10, and an electronic control apparatus 50 to perform fuel injection control.

Each of the injectors 10 includes a pressure sensor 11, an output circuit 12, an NVRAM 13, a communication driver 15 and a communication processing section 17. The pressure sensor 11 measures the fuel injection pressure of the injector 10. The output circuit 12 delivers a sensor signal indicative of the measured fuel injection pressure to a sensor output line LS.

Figure 2:
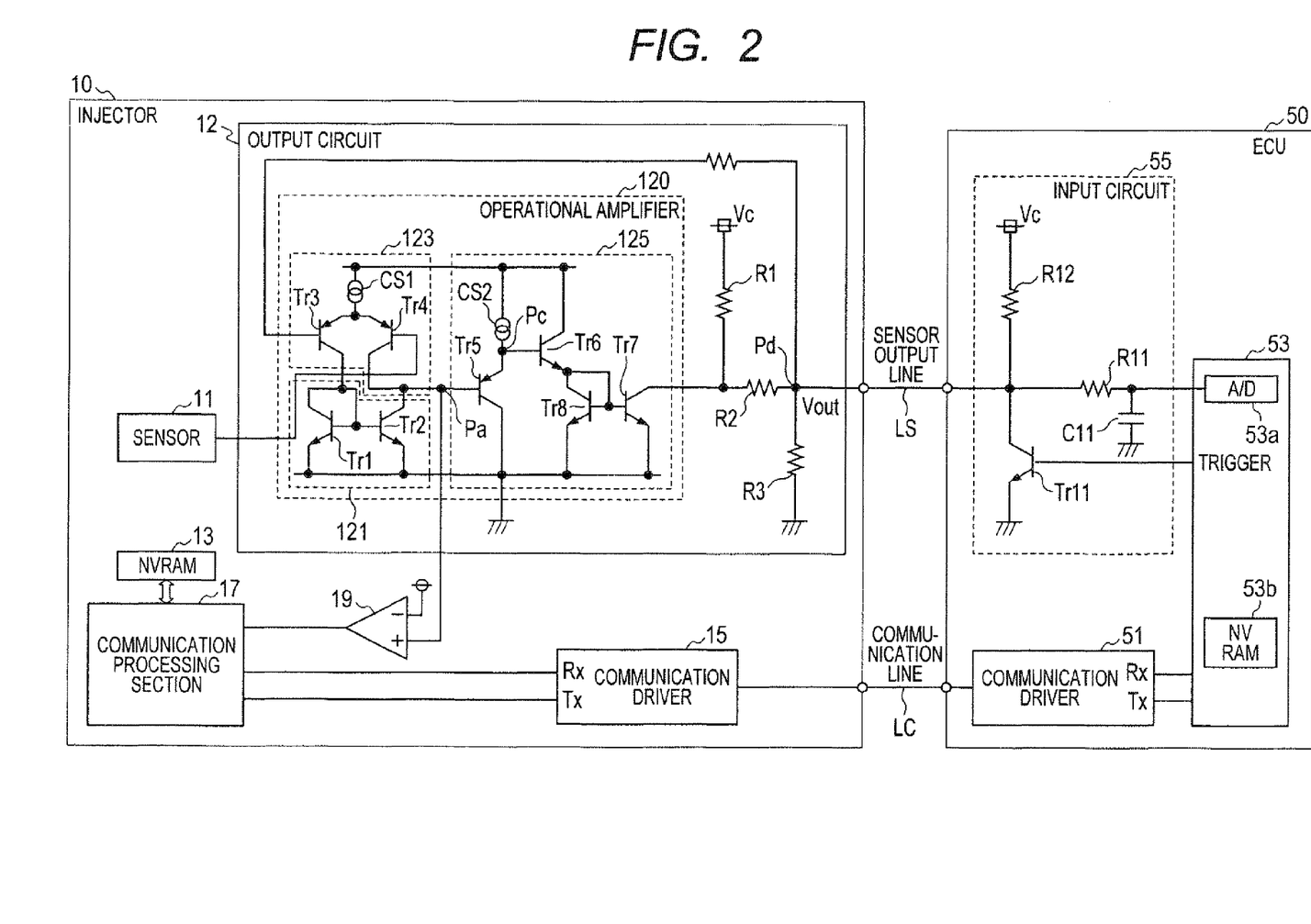
FIG. 2 is a diagram showing the structures of an injector 10 and an electronic control apparatus 50 of the injector drive system.

As shown in FIG. 2, the output circuit 12 is constituted as a buffer circuit. The sensor output lines LS is a signal line for transmitting the sensor signal outputted from the corresponding pressure sensor 11 to the electronic control apparatus 50.

The injector drive system 1 of this embodiment includes the sensor output lines LS for the respective pressure sensors 11. The sensor signals outputted from the pressures sensors 11 of the respective injectors 10 are outputted to the electronic control apparatus 50 through the corresponding output circuits 12 and sensor output lines LS.

The NVRAM 13, which is an electrically rewritable nonvolatile memory, for example, an EEPROM, is for storing sensor characteristic values and injector characteristic values. The injector 10 has a function of transmitting the characteristic values stored in the NVRAM 13 to the electronic control apparatus 50 through a communication line LC, and a function of writing learned values regarding the characteristic values transmitted from the electronic control apparatus 50 through the communication line LC into the NVRAM 13 to update the characteristic values stored therein. These functions are implemented by the communication driver 15 and the communication processing section 17.

The communication driver 15 incorporated in each of the injectors 10 is connected to the communication line LC, and is configured to transfer communication data transmitted from the electronic control apparatus 50 through the communication line LC to the communication processing section 17 and deliver communication data received from the communication processing section 17 to the communication line LC, in order to enable communication between the injectors 10 and the electronic control apparatus 50. The communication line LC is commonly used by the respective injectors 10. The communication drivers 15 of the respective injectors 10 are bus-connected to the communication line LC.

The communication processing section 17 performs various processes in accordance with communication data received from the communication control apparatus 50 through the communication driver 15. For example, the communication processing section 17 generates response data in response to communication data received from the electronic control apparatus 50, and transmits the response data to the electronic control apparatus 50 through the communication driver 15.

The communication line LC connected to the communication drivers 15 of the respective injectors 15 is used for data communication between the in injectors 10 and the electronic control apparatus 50 to set node IDs, read or update the characteristic values. The sensor signals outputted from the pressure sensors 11 of the injectors 10 are transmitted to the electronic control apparatus 50 through the sensor output lines LS provided for each of the injectors 10, rather than through the communication line LC.

The electronic control apparatus 50 includes a communication driver 51 connected to the communication line LC, a microcomputer 53 to perform fuel injection control of the injectors 10, and input circuits 55 provided for the respective sensor output lines LS.

More specifically, the microcomputer 53 performs the fuel injection control by inputting fuel injection signals (injector drive signals) to the electronic driver apparatus 30 through a control line provided separately from the communication line LC and the sensor output lines LS. The microcomputer 53 is connected with the sensor output lines LS of the pressure sensors 11 through the input circuits 55 to receive the sensor signals outputted from the pressures sensors 11 of the respective injectors 10.

As shown in FIG. 2, the input circuit 55 is provided with a filter circuit constituted of a capacitor C11 and a resistor R11. The sensor signal transmitted through the sensor output line LS is inputted to an A/D converter 53*a* incorporated in the microcomputer 53 through the filter circuit.

The A/D converter 53*a* is provided for each of the input circuits 55 connected to the corresponding sensor output lines LS. The sensor signal transmitted through the sensor output line LS and inputted to the electronic control apparatus 50 through the input circuit 55 is converted to a digital signal by the A/D converter 53*a* to be used for the fuel injection control performed by the microcomputer 53. A value measured by the pressure sensor 11 indicated by the sensor signal is compensated in accordance with the sensor characteristic values which the microcomputer 53 reads from the corresponding injector 10 through the communication line 53, and is used for the fuel injection control.

As shown in FIG. 2, the input circuit 55, which operates on the power supply voltage Vc=5 V, includes an NPN transistor Tr11 and a resistor R12. The base terminal of the NPN transistor Tr11 of the input circuit 55 is connected to a trigger terminal of a corresponding one of the input circuits 55 of the microcomputer 53. The NPN transistor Tr11 is grounded at its emitter terminal and connected to the sensor output line LS at its collector terminal.

When the base voltage of the NPN transistor Tr11 is set to the high voltage level through the trigger terminal by the microcomputer 53, the NPN transistor Tr11 is turned on causing the voltage of the sensor output line LS to be equal to 0 V, as a result of which the sensor output line LS is set to a disabled state in which the sensor signal cannot be transmitted on the sensor output line LS. When the base voltage of the NPN transistor Tr11 is set to the low voltage level through the trigger terminal by the microcomputer 53, the NPN transistor Tr11 is turned off, as a result of which the sensor output line LS is set to an enabled state in which the sensor signal can be transmitted on the sensor output line LS.

In this embodiment, to transmit communication data requesting to set the node ID to a selected one of the injectors 10, the microcomputer 53 changes the base voltage of the NPN transistor Tr11 connected to the sensor output line LS connected to this destination injector 10 to the high voltage level, while keeping the base voltages of the NPN transistors 11 connected to the other injectors 10 to which the communication data is not addressed at the low voltage level. The above described on/off operation of the NPN transistor Tr11 of each of the input circuits 55 is for informing, through the sensor output lines LS, the respective injectors 10 of a destination of communication data outputted from the communication driver 51.

Next, the circuit structure of the injector 10 is explained. As shown in FIG. 2, the output circuit 12 incorporated in the injector 10 is a buffer circuit constituted of an operational amplifier 120 and resistors R1, R2 and R3, the operational amplifier 120 being inputted with the output of the pressure sensor 11 and its output. In more detail, the output terminal of the operational amplifier 120 is connected to the negative input terminal thereof, and the output terminal of the pressure sensor 11 is connected to the positive input terminal of the amplifier 120 to constitute a buffer circuit.

The operational amplifier 120 includes, at its input stage, a differential amplifier circuit 123 loaded with a current mirror circuit 121, and includes, at its output stage, an amplifier circuit (an emitter follower circuit, for example) 125 to reduce the output impedance. The current mirror circuit 121 includes NPN transistors Tr1 and Tr2. The differential amplifier circuit 123 includes a constant current source CS1, and PNP transistors Tr3 and Tr4.

The amplifier circuit 125 of the output stage of the operational amplifier 120 is configured to include an emitter follower circuit mainly constituted of a PNP transistor Tr5 whose base terminal is connected with the output terminal of the differential amplifier circuit 123. This amplifier circuit 125 includes a constant current source CS2, the PNP transistor Tr5 and NPN transistors Tr6, Tr7 and Tr8.

The output circuit 12 including the operational amplifier 120 configured as above controls the voltage applied to the sensor output line LS by adjusting the base current of the NPN transistor Tr7, so that an output signal corresponding to the voltage of the sensor signal inputted from the pressure sensor 11 is delivered to the sensor output line LS. When the base current of the NPN transistor Tr7 increases, the current drawn from the resistor R1 and flowing to the NPN transistor Tr7 increases, as a result of which the output voltage Vout of the output circuit 12 decreases. On the other hand, when the base current of the NPN transistor Tr7 decreases, the current drawn from the resistor R1 and flowing to the NPN transistor Tr7 decreases, as a result of which the output voltage Vout of the output circuit 12 increases.

In this way, the output voltage Vout is adjusted to a value corresponding to the voltage of the sensor signal outputted from the pressure sensor 11.

In this embodiment, the output voltage Vout of the output circuit 12 is ranged between 0 V and 5 V ($0.8 \leq \text{Vout} \leq 4.8$ V, for example) by the resistors R1 applied with the power supply voltage Vc of 5 V, the grounded resistor R3 and the resistor R2 connecting the resistors R1 and R3 with each other. However, the resistor R3 to limit the output voltage Vout below 5 V may be removed. In this case, the output voltage Vout may exceed 5 V.

Since the output circuit 12 is constituted as a buffer circuit, while the NPN transistor Tr11 of the electronic control apparatus 50 connected to the sensor output line LS is off and accordingly the sensor output line LS is in the enabled state (the state in which the sensor signal can be transmitted on the sensor output line LS), the output voltage Vout of the output circuit 12 is adjusted to a value corresponding to the voltage of the sensor signal outputted from the pressure sensor 11.

On the other hand, when the base voltage of the NPN transistor Tr11 connected to the sensor output line LS is set to the high voltage level by the microcomputer 53, and accordingly the NPN transistor Tr11 is on to cause the voltage of the sensor output line LS to be 0 V, since the output voltage Vout is below the voltage range of the sensor signal outputted from the pressure sensor 11, the base current of the NPN transistor Tr7 of the output circuit 12 is reduced and as a result the output voltage increases.

However, since a difference still exists between the voltage of the negative input terminal of the operational amplifier 120 (which is equal to the output voltage Vout) and the voltage of the positive input terminal (which is equal to the voltage of the sensor signal outputted from the pressure sensor 11), the base current of the NPN transistor Tr 7 converges to 0 eventually. At this time, the voltage of the output node Pa of the differential amplifier 123 becomes 0 V.

In the normal state where the NPN transistor Tr11 of the input circuit 55 is off, since there is no substantial difference between the negative and positive input terminals of the operational amplifier 120, the voltage of the output node Pa of the differential amplifier 123 is stable at a nearly constant value (around 1 V). That is, the voltage of the output node Pa changes significantly depending on whether the sensor output line LS is in the enabled state in which the sensor signal can be transmitted on the sensor output line LS, or the disabled state in which the sensor signal cannot be transmitted on the sensor output line LS.

Accordingly, in this embodiment, the injector 10 is configured to determine whether or not the sensor output line LS is in the disabled state by making a comparison between the voltage of the output node Pa of the differential amplifier 123 and a threshold voltage. Although omitted from illustration in FIG. 1, the injector 10 includes a comparator 19 as shown in FIG. 2. The comparator 19 is applied with the threshold voltage at its negative input terminal, and applied with the voltage of the output node Pa of the differential amplifier 123 at its positive input terminal.

Accordingly, the comparator 19 outputs a signal of the high level when the voltage of the output node Pa of the differential amplifier 123 is higher than the threshold voltage, and otherwise outputs a signal of the low level.

The output signal of the comparator 19 is supplied to the control processing section 17. The control processing section 17 determines whether or not the sensor output line LS connected to the output circuit 12 of the own injector 10 is in the disabled state of being set to 0 V based on whether the signal inputted from the comparator 19 is at the low level or high level. More specifically, the communication processing section 17 determines that the sensor output line is LS in the disabled state if the signal inputted from the comparator 19 is at the low level, and determines that the sensor output line LS is in the enabled state if the signal inputted from the comparator 19 is at the high level.

Incidentally, if the sensor output line LS is grounded, the voltages of the points Pc and Pd shown in FIG. 2 also change. However, it is difficult to distinguish, by referring to the voltage of the point Pc or Pd, between a case where the voltage of the sensor signal is abnormally low although the sensor output line LS is in the enabled state due to effects of temperature change and a case where the sensor output line LS is set in the disabled state. That is, it is difficult to determine a value of the threshold voltage to prevent an erroneous determination. On the other hand, the voltage at the point Pa is stable at around 1 V sufficiently higher than 0 V even when the voltage of the sensor signal is abnormally low as long as the sensor output line LS is in the enabled state and not grounded. Accordingly, in this embodiment, a determination whether the sensor output line LS is in the enabled state or disabled state is made based on the voltage of the point Pa.

Figure 3:
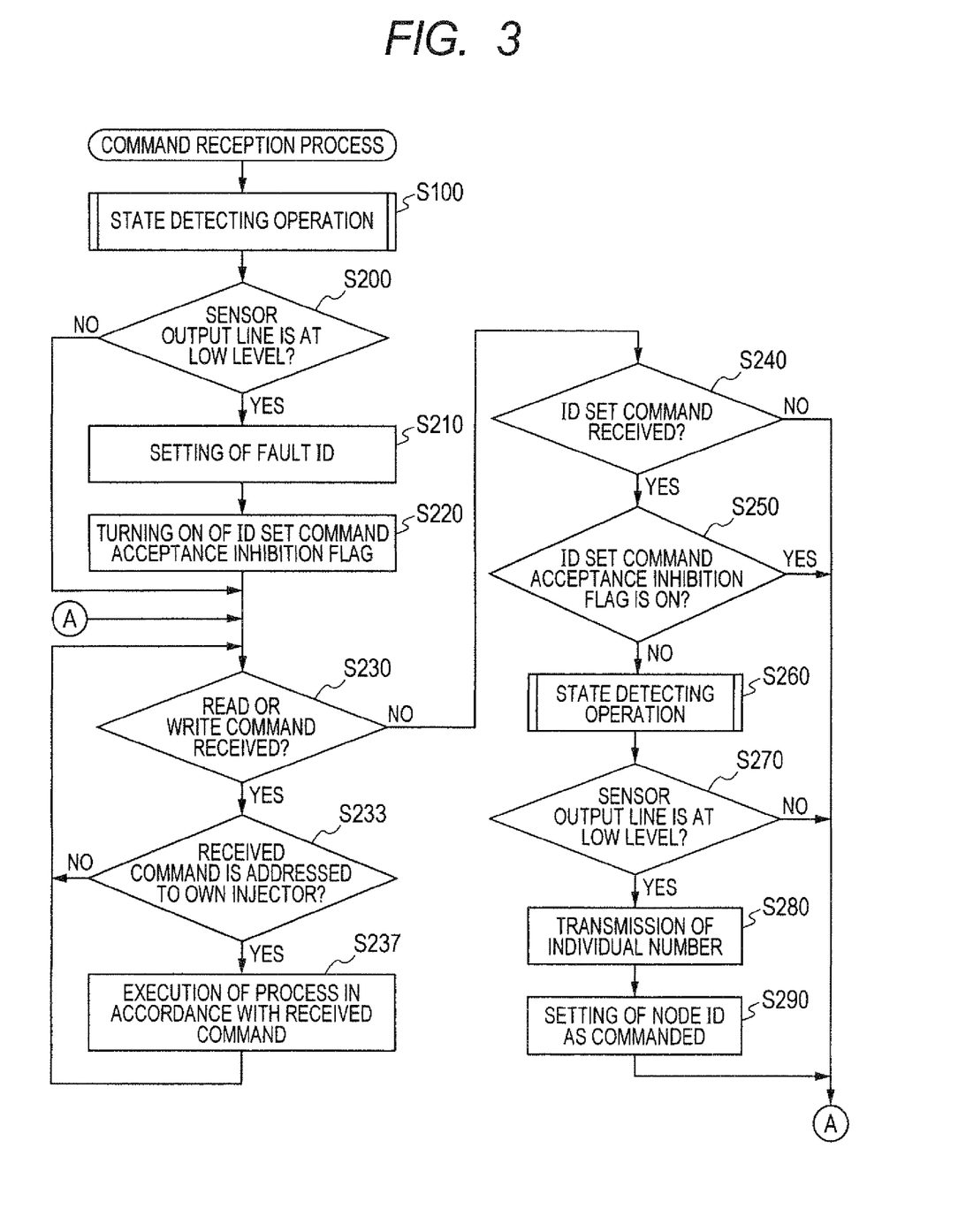
FIG. 3 is a flowchart showing a command reception process performed by a communication processing section 17 included in the injector 10.

The communication processing section 17 of the injector 10 performs a command reception process shown in FIG. 3 when it starts operation. The command reception process begins in step S100 to perform a state detecting operation shown in FIG. 4. The state detecting operation begins in step S110 where the number of sampling times Ns and the number of low signal detection times Nd are reset to 0. In the subsequent steps S120 to S150, a determination on whether the signal inputted to the comparator 19 is at the high voltage level or low voltage level is made repeatedly by a predetermined number of times Nn.

Figure 4:
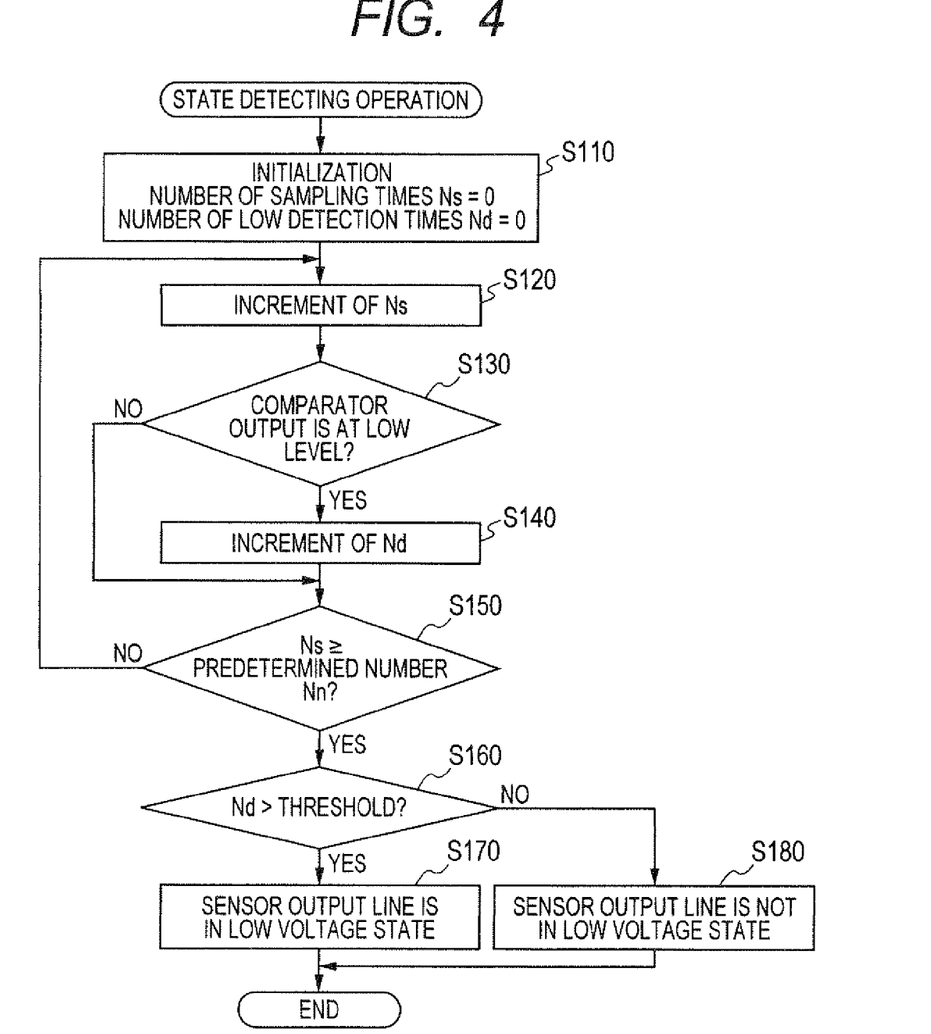
FIG. 4 is a flowchart showing a state detecting operation performed by the communication processing section 17 included in the injector 10.

More specifically, after step S110, the number of sampling times Ns is incremented by 1 in step S120, and then it is determined whether or not the input signal of the comparator 19 is at the low voltage level in step S130. If the determination result in step S130 is affirmative, the operation proceeds to step S140 to increment the number of low signal detection times Nd by 1, and then proceeds to step S150. If the determination result in step S130 is negative, the operation proceeds to step S150 without updating the number of low signal detection times Nd.

In step S150, it is determined whether or not the number of sampling times Ns is larger than or equal to the predetermined number Nn. If the determination result in step S150 is negative, the operation returns to step S120. In this way, a determination on whether the input signal to the comparator 19 is at the high voltage level or low voltage level is made repeatedly by the predetermined number of times Nn through steps S120 to S150.

If the determination result in step S150 is affirmative, the operation proceeds to step S160 to determine whether or not the number of low signal detection times Nd exceeds a threshold. If the determine result in step S160 is affirmative, the operation proceeds to step S170 to make a determination that the sensor output line LS connected to the own injector 10 is in the low voltage state, and then this operation is terminated with this determination result as a return value. If the determination result in step S150 is negative, the operation proceeds to step S180 to make a determination that sensor output line LS is in the non-low level state, and this operation is terminated with this determination result as a return value.

Figure 5:
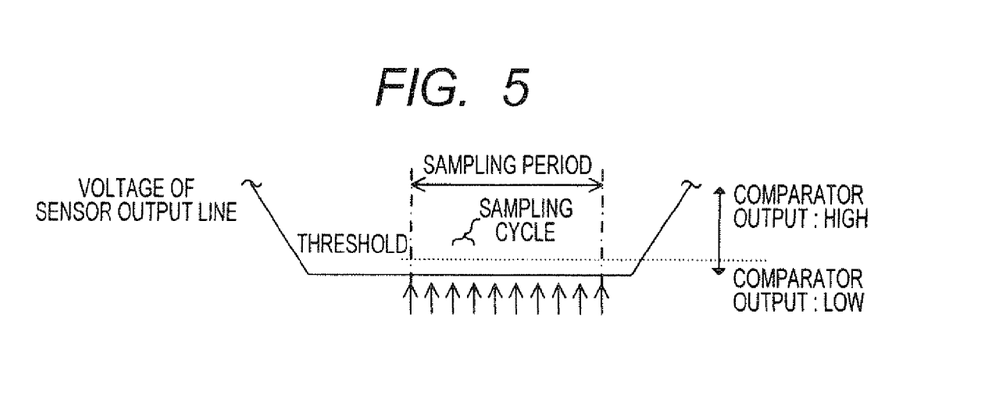
FIG. 5 is a diagram showing a principle of state determination in the state determining process.

As shown in FIG. 5, in the state detecting operation, after the signal inputted to the comparator 19 is sampled by the predetermined number of times Nn, it is determined that that the sensor output line LS is at the low level (0 V) if the number of low signal detection times Nd is larger than or equal to the threshold, and otherwise it is determined that that the sensor output line LS is not at the low level (0 V). Accordingly, the state of the sensor output line LS can be determined accurately without being affected by noise. Incidentally, the sensor output line LS is brought to the low voltage level (0 V) not only when the NPN transistor Tr11 is on but also when there is a ground short. Step S100 is for detecting presence of a ground short.

When step S100 is completed, that is, when the state detecting operation is terminated, the command reception process proceeds to step S200 to determine whether the sensor output line LS is determined to be at the low level by the state detecting operation. If the determination result in step S200 is affirmative, since it means that there is a ground short, the process proceeds to step S210 to set the node ID of the own injector 10 to a specific one showing presence of a predetermined fault (referred to as "fault ID" hereinafter). Thereafter, the process proceeds to step S220 to turn on an ID set command acceptance inhibition flag, and then proceeds to step S230.

If the determination result in step S200 is negative, the process proceeds to step S230 leaving the node ID of the own injector 10 unset, and leaving the ID set command acceptance inhibition flag off.

In step S230 and subsequent step S240, the process waits until the communication processing section 17 receives an ID set command, a read command or a write command from the electronic control apparatus 50 through the communication driver 15.

If a read command or write command is received (YES in step S230), the process proceeds to step S233 to determine whether or not the received command is addressed to the own injector 10 based on the node ID attached to this received command. The read command is communication data commanding to read data from the NVRAM, and the write command is communication data commanding to write data contained in this write command into the NVRAM 13. Each of the read command and write command is attached with the node ID of the injector 10 to which it is addressed.

In step S233, it is determined whether the received command is addressed to the own injector 10 by checking whether the node ID attached to the received command agrees with the node ID of the own injector 10. In a case where no ID is assigned to the own injector 10, it is determined that the received command is not addressed to the own injector 10. If the determination result in step S233 is affirmative, the process proceeds to step S237 to perform a process instructed by the received command.

For example, when the received command is a read command, data specified by this read command is read from the NVRAM 13, and communication data containing this read data is transmitted to the electronic control apparatus 50 through the communication driver 15 as response data. On the other hand, when the received command is a write command, data contained this received command is written into the NVRAM 13. In the above described way, the injector 10 transmits the characteristic values stored in the NVRAM to the electronic control apparatus 50, and writes learned values received from the electronic control apparatus 50 into the NVRAM 13.

When step S237 is completed, the process returns to step S230 to wait until a next command is received. If the determination result in step S233 is negative, the process returns to step S230 without performing step S237 while discarding the received command.

If the determination result in step S240 is affirmative, that is, when an ID set command is received, the process proceeds to step S250. The ID set command is communication data commanding to set the node ID of the injector 10 containing information regarding a node ID to be set.

In step S250, it is determined whether or not the ID set command acceptance inhibition flag is on. If the determination result in step S250 is affirmative, the process returns to step S230 while discarding the received ID set command.

If the determination result in step S250 is negative, the process proceeds to step S260 to perform a state detecting operation shown in FIG. 4. This state detecting operation, which has the same content as the state detecting operation performed in step S100, is for determining whether or not the sensor output line LS connected to the own injector 10 is in the disabled state in which its voltage is set to 0 V by the NPN transistor Tr11 of the electronic control apparatus 50 being turned on.

When the state detecting operation in step S260 is completed, the process proceeds to step S 270 to determined whether or not the sensor output line LS connected to the own injector10 has been determined to be in the disabled state based on a return value of the state detecting operation. If the determination result in step S270 is affirmative, the process proceeds to step S280 to transmit the individual number of the own injector 10 assuming that the sensor output line LS connected to the own injector 10 is set to 0 V by the NPN transistor of the electronic control unit 50, and the received ID set command is the one addressed to the own injector 10, and then proceeds to step S290 to set and store the node ID specified by the received ID set command as the node ID of the own injector 10. Thereafter, the process returns to step S230 to wait until a next command is received. The individual number to be transmitted to the electronic control apparatus 50 may be the serial number of the own injector 10.

Figure 6:
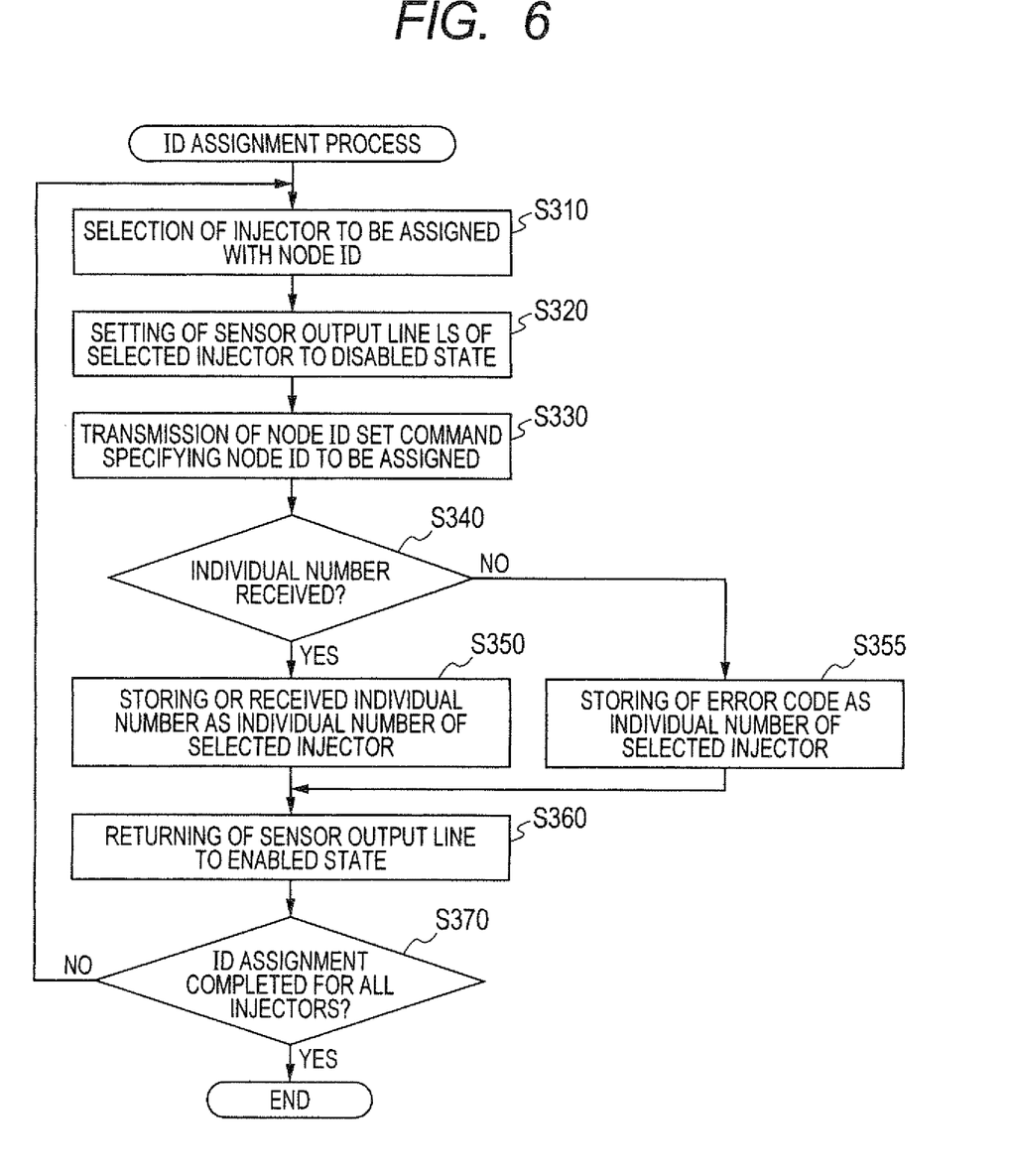
FIG. 6 is a flowchart showing an ID assignment process performed by a microcomputer 53 included in the electronic control apparatus 50.

Next, an ID assignment process performed by the microcomputer 53 of the electronic control apparatus 50 is explained with reference to the flowchart of FIG. 6. The microcomputer 53 performs the ID assignment process before starting the fuel injection control for the injector 10 selected as an object of this ID assignment process. For a vehicle in which the cylinders of its engine start operation in stages (a hybrid vehicle for example), this ID assignment process may be performed in stages.

The ID assignment process begins in step S310 where the microcomputer 53 selects one of the injectors 10 as an object of the ID assignment process. Subsequently, the process proceeds to step S320 to set the voltage of the sensor output line LS connected to the injector 10 selected as an object of the ID assignment process to the low voltage level (0 V) by changing the base voltage of the NPN transistor Tr11 of the input circuit 55 connected to this sensor output line LS from the low level to the high level.

In this embodiment, the base voltages of the NPN transistors Tr11 of all the input circuits 55 are all kept in the low level in their initial state. Accordingly, in step S320, the base voltages of the NPN transistors Tr 11 of the input circuits 55 connected to the sensor output lines LS connected to the injectors 10 other than the injector 10 selected as an object of the ID assignment process are kept at the low level so that these sensor output lines LS are kept at the enabled state. In this state, the sensor output line LS connected to the selected injector 10 is set to the disabled state.

When step S320 is completed, the process proceeds to step S330 where the microcomputer 53 generates an ID set command as communication data specifying the node ID to be assigned to the injector 10 selected as an object of the ID assignment process, and delivers this ID set command to the communication line LC through the communication driver 51.

The ID set command may specify the cylinder number of one of the cylinders of the engine to which the selected injector 10 is mounted as the node ID to be set.

As explained above, in this embodiment, the ID set command addressed to the injector 10 selected as an object of the ID assignment process by changing the voltage state of the sensor output line LS connected to the selected injector 10 is delivered to the communication line LC (step S330).

Figure 7:
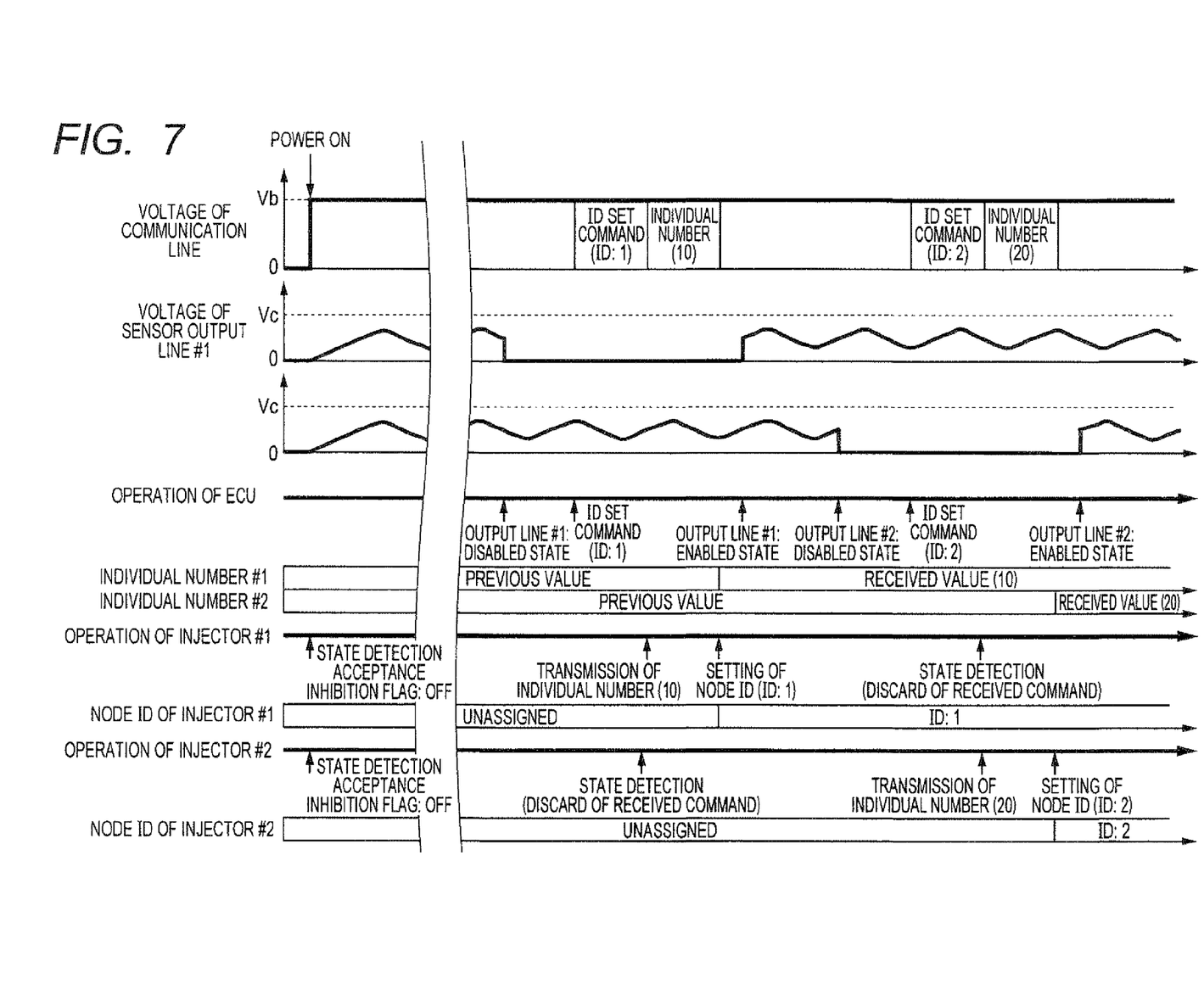
FIG. 7 is a time chart showing an example of voltage variations with time of sensor output lines and state changes of various components of the injector drive system.

For example, when the object of the ID assignment process is the injector 10 of the first cylinder, as shown in FIG. 7, the voltage of the sensor output line LS connected to the injector 10 of the first cylinder is set to the low level, the sensor output lines LS connected to the injectors 10 of the other cylinders are kept in the enabled state, and the ID set command specifying the value of 1 as the node ID to be set is delivered to the communication line LC.

In FIG. 7, there are shown variations with time of the voltage and transmission data of the communication line LC, the voltage of the sensor output line LS (sensor output line #1) of the first cylinder, the voltage of the sensor output line LS (sensor output line #2) of the second cylinder, the operation flow of the electronic control apparatus 50 (ECU), the individual numbers (individual numbers #1 and #2) of the first and second cylinders held by the electronic control apparatus 50, the operation flow of the injector 10 (injector #1) of the first cylinder, the set state of the node ID of the injector 10 of the first cylinder, the operation flow of the injector 10 (injector #2) of the second cylinder, and the set state of the node ID of the injector 10 of the second cylinder, when there is no ground short in the sensor output lines LS.

In step S340 subsequent to step S330, the microcomputer 53 waits until response data in response to the ID set command containing the individual number of the injector 10 is received, or a predetermined time elapses. In this embodiment, the injector 10 that has received the ID set command addressed to itself transmits response data containing its individual number to the electronic control apparatus 50 in response to this received ID set command as long as there is no fault such as a ground short.

If the microcomputer 53 receives a response data before the predetermined time elapses (YES in step S340), the process proceeds to step S350 to update management data for the injector 10 selected an object of the ID assignment process, and then proceeds to step S350.

The microcomputer 53 stores, for each of the cylinders, the node ID to be assigned to the cylinder, the individual number of the injector 10 mounted on the cylinder, and a flag showing presence or absence of a record of replacement of the injector 10, as the management data in an electrically rewritable non-volatile memory NVRAM 53b incorporated therein.

In step S350, the information regarding the individual number contained in the management data for the injector 10 selected as an object of the ID assignment process is updated with the information regarding the received individual number, and this received individual number is compared with the previously stored individual number. If they are different from each other, the flag showing presence or absence of a record of replacement or repair of the injector 10 (referred to as "replacement flag") is turned on, and otherwise the flag is turned off.

The microcomputer 53 stores therein information regarding the characteristic values of the injector 10 other than the above management data in the NVRAM 53b for each of the cylinders. The characteristic values, which are read from each injector 10 and stored in the NVRAM53b, are updated to the ones compensated by a learning operation performed by the microcomputer 53 as appropriately. When the replacement flag is updated to the on state for one of the cylinders, the microcomputer 53 transmits, through the communication driver 51, a read command addressed to the node ID assigned to this injector 10, and stores the characteristic values contained in communication data transmitted from this injector 10 as response data in the NVRAM53b.

If the predetermined time has elapsed before any response data is received (NO in step S340), the process proceeds to step S 355 to update the management data of the cylinder corresponding to the injector 10 selected as an object of the ID assignment process by rewriting the individual number shown by the management data to an error code, and then proceeds to step S360.

Figure 8:
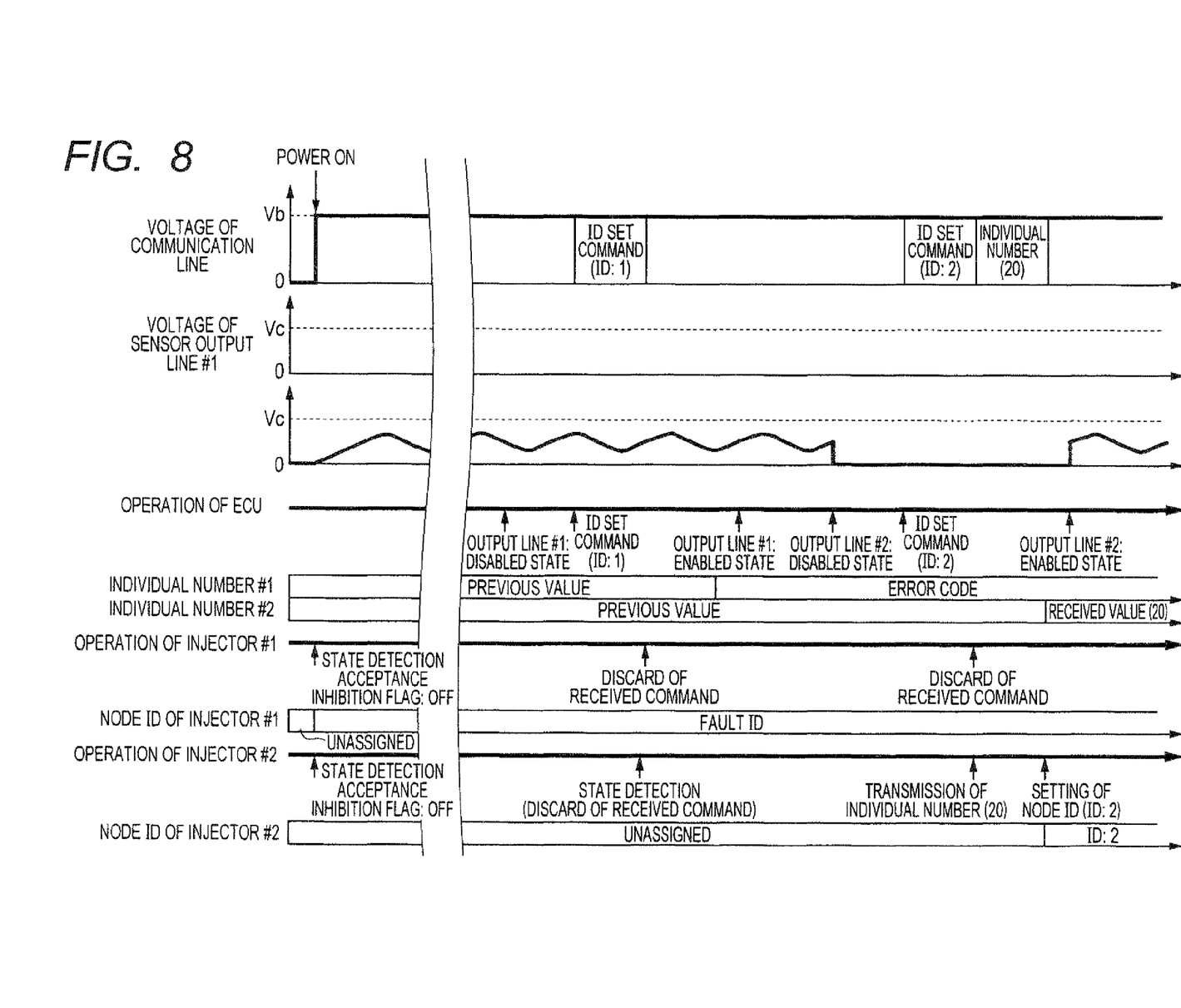
FIG. 8 is a time chart showing another example of voltage variations with time of the sensor output lines and state changes of the various components of the injector drive system.

FIG. 8 is a diagram showing, in a case where there is a ground short in the sensor output line LS (the sensor output line #1) of the first cylinder, variations with time of the voltage and transmission data of the communication line LC, the voltage of the sensor output line LS (sensor output line #1) of the first cylinder, the voltage of the sensor output line LS (sensor output line #2) of the second cylinder, the operation flow of the electronic control apparatus 50 (ECU), the individual numbers (individual numbers #1 and #2) of the first and second cylinders held by the electronic control unit 50, the operation flow of the injector 10 (injector #1) of the first cylinder, the set state of the node ID of the injector 10 of the first cylinder, the operation flow of the injector 10 (injector #2) of the second cylinder, and the set state of the node ID of the injector 10 of the second cylinder.

As shown in FIG. 8, if there is a ground short in the sensor output line LS of the first cylinder, since the injector10 of the first cylinder 10 turns off the ID set command acceptance inhibition flag when it starts operation in order to discard an ID set command received thereafter, it does not occur that the electronic control apparatus 50 receives response data containing the individual number from the injector 10 of the first cylinder even when an ID set command is transmitted from the electronic control apparatus 50 to the injector 10 of the first cylinder.

Accordingly, in this case, the electronic control apparatus 50 rewrites the individual number shown by the management data of the corresponding cylinder into an error code. When such an error occurs, the microcomputer 53 issues an alarm, for example, turns on an alarm light.

In step S360, the sensor output line LS connected to the injector 10 as an object of the ID assignment process is returned to the enabled state. More specifically, in step S360, the base voltage of the NPN transistor Tr11 of the input circuit 55 connected to this sensor output line LS is changed from the high level to the low level to return this sensor output line LS to the enabled state. Thereafter, the process proceeds to step S370.

In step S370, it is determined whether or not the operations of step S320 and the following steps have been completed for all the injectors 10 whose node IDs have to be set. If the determination result in step S370 is negative, the process returns to step S310 to select the injector 10 whose node ID has not been set yet, and the operations of step 9320 and the following step are performed.

If the determination result in step S370 is affirmative, the ID assignment process is terminated. As explained above, in this embodiment where the node IDs of the respective injectors 10 are set each time the vehicle engine is started, a read command or a write command attached with a destination node ID set in the above described way is transmitted to the injector 10 having this destination ID through the communication line LC. To obtain information regarding the characteristic values from the injector 10 detected to have been replaced based on the replacement flag described in the cylinder-specific management data, the microcomputer 53 transmits a read command attached with the node ID of this injector 10 as the address information, and the information regarding the characteristic values contained in response data from this injector is stored in the NVRAM 53b.

After the engine is stopped, learned values for the characteristic values are stored in the NVRAM 53b, and also outputted to the corresponding injectors 10 through the communication line LC, so that each of the injectors 10 can update the characteristic values stored in the NVRAM 13. To transmit a write command to the injector 10 which needs to update the characteristic values, the node ID of this injector 10 is attached to this write command as address information.

As described above, the injector derive system 1 of this embodiment is configured such that an ID set command is delivered from the electronic control apparatus 50 to the communication line LC in the state that the sensor output line LS connected to the injector 10 which is the destination of the ID set command is grounded to be set in the disabled state where the sensor signal cannot be transmitted, and the sensor output lines LS connected to the other injectors 10 which are not the destination of the ID set command are kept in the enabled state where the sensor signal can be transmitted. This makes it possible for each injector 10 to detect whether the transmitted ID set command is addressed to itself, so that the nodes ID of the respective injectors 10 can be set through the communication line LC.

According to the injector drive system 1 of this embodiment, since it is not necessary to set the node IDs of the injectors 10 before installing the injectors 10 to the system by connecting them to the communication line LC, it is possible to prevent that the sensor output line LS is erroneously connected with the injector 10 whose node ID does not corresponds to this sensor output line LS.

Further, according to this embodiment, since each injector 10 is configured to determine the state of the sensor output line LS based on the operation state of the output circuit 12 serving as a buffer circuit, it is possible to reliably distinguish whether the sensor output line LS is in the enabled state or disabled state even when the voltage the sensor output signal is low (close to 0 V).

This allows to perform communication with address between the electronic control apparatus 50 and the destination injector 10 without stopping transmission of the sensor signals through the sensor output lines LS connected to the injectors 10 other than the destination injector 10. That is, according to this embodiment, it is possible to construct a vehicle-use communication system superior to the conventional systems where sensor signal transmission has to be stopped for all the signal lines connected to sensor devices each provided with a communication function before transmitting communication data to one of the sensor devices.

For example, according to this embodiment, during the process of setting the node ID of the injector 10 not yet assigned with a node ID by changing the voltage state of the sensor output line LS connected to this injector 10, it is possible to keep the sensor output lines LS connected to the injectors 10 already assigned with node IDs in the enabled state to allow transmission of the sensor signals. Accordingly, it is possible to start the fuel injection control successively from the injector 10 having been assigned with a node ID without stopping, at the time of setting the node ID of the fuel injector 10 not yet assigned with a node ID, transmission of the sensor signals form the pressures sensors 11 of the injectors 10 already under control of the fuel injection control. Hence, according to this embodiment, it is possible to improve the startability of the engine.

Further, according to this embodiment, since the state of the sensor output line LS is determined by referring to the output of the comparator 19 multiple times, the state of the sensor output line LS can be determined accurately without being affected by noise.

In this embodiment, since the sensor output line LS is set to the disabled state by setting the voltage of the sensor output line LS to 0 V which is outside its range in the normal state (enabled state) allowing the sensor signal to transmit, it is possible to reliably distinguish whether the sensor output line LS is in the enabled state or the disabled state. However, if there occurs a ground short in the sensor output line LS, it is not possible to distinguish whether the sensor output line LS is set to the disabled state or there is a ground short in the sensor output line LS although the sensor output line LS is set in the enabled state. To cope with this problem, the injector 10 is configured to detect presence of a ground short by performing the state detecting operation before the electronic control apparatus 50 starts the node ID assignment process. More specifically, the electronic control apparatus 50 sets the sensor output line LS connected to the injector 10 selected as an object of the node ID assignment process to the low level (step S320) taking into account the time necessary for the injector 10 to complete the operation to detect presence of a ground short (step S100), That is, the ID assignment process by the electronic control apparatus 50 is started after completion of the operation to detect presence of a ground short by the injector 10.

It is a mater of course that various modifications can be made to the above described embodiment as described below.

Although the above embodiment is directed to an injector drive system, the present invention is applicable to a control system including an electronic control apparatus and a plurality of sensor devices with a communication function connected to the control system through other than a bus.

In the injector drive system of the above embodiment, the electronic control apparatus 50 and the electronic driver apparatus are disposed separately, however, they may be integrated as one apparatus.

The injector drive system 1 described above is configured such that transmission of the characteristic values are performed after node IDs are written to the injectors 10. However, in a case where communication with the injectors 10 is performed only just for writing learned values into the injectors 10 after the fuel injection control is stopped (or after the engine is stopped), it is not necessary to set the node IDs such that data communication can be performed even during the fuel injection control, because data communication is not necessary during the fuel injection control. For such a case, the injector drive system 1 may be configured such that the characteristic values are read from the injectors 10 by communication with address by changing the state of the communication line LC, and the fuel injection control is performed based on the read characteristic values, and learned values regarding the characteristic values are written into the injectors10 by communication with address by changing the state of the communication line LC after the engine is stopped.

In the above embodiment, the disabled state of the sensor output line LS is a state where the voltage of the sensor output line LS is set to 0 V. However, the voltage of the sensor output line LS in the disabled state may be a voltage other than 0 V, which is outside the range of the voltage of the sensor output line LS determined by the output circuit 12.

In the above embodiment, the microcomputer 53 performs the ID assignment process. However, the ID assignment process may be performed by a dedicated IC.

The above explained preferred embodiments are exemplary of the invention of the present application which is described solely by the claims appended below. It should be understood that modifications of the preferred embodiments may be made as would occur to one of skill in the art.

What is claimed is:

1. A control system comprising:
   a plurality of sensor apparatuses each including a sensor, an output circuit connected to the sensor, and a communication device; and an electronic control apparatus to which the communication devices of the sensor apparatuses are connected through a common communication line to enable data communication between the electronic control unit and each of the sensor apparatuses, the electronic control apparatus being connected to signal lines respectively connected to the output circuits of the sensor apparatuses to enable receiving sensor signals respectively outputted from the sensor apparatuses, the electronic control apparatus including a transmission control means configured to, prior to transmitting communication data to one of the sensor apparatuses, set the signal lines connected to the other sensor apparatuses to which the communication data is not addressed in an enabled state in which the sensor signal is allowed to be transmitted, and set the signal line connected to the one of the sensor apparatus to which the communication data is addressed in a disabled state in which the sensor signal is inhibited from being transmitted, each of the sensor apparatuses including a determination means to determine whether or not the signal line connected to the own sensor apparatus is in the disabled state based on an operation state of the output circuit of the own sensor apparatus, and a reception control means configured to accept the communication data received in the communication device to perform an operation in accordance with the accepted communication data when the signal line connected to the own sensor apparatus is determined to be in the disabled state by the determination means, and discard the received communication data when the signal line connected to the own sensor apparatus is determined to be in the enabled state by the determination means;

wherein the output circuit is a buffer circuit constituted of an operational amplifier including at an input stage thereof a differential amplifier loaded with a current mirror circuit and inputted with an output of the sensor and an output of the operational amplifier, and the determination means is configured to determine whether or not the signal line is in the disabled sate based on an voltage of an output node of the input stage.

2. The control system according to claim 1, wherein the disabled state set by the transmission control means is a state in which the signal line is at a predetermined voltage outside a voltage range of the signal line in the enabled state.

3. The control system according to claim 1, wherein
the transmission control means grounds the signal line to set the signal line in the disabled state.

4. The control system according to claim 1, wherein
the transmission control means is configured to successively select one of the sensor apparatuses as an object of a node ID assignment process performed by the electronic control apparatus for assigning node IDs to the respective sensor apparatuses, transmit specific communication data containing a node ID set command specifying a node ID to be assigned to the selected sensor apparatus while setting the signal line connected to the selected sensor apparatus in the disabled state, and setting the signal lines of the sensor apparatuses other than the selected sensor apparatus in the enabled state, the reception control means of each of the sensor apparatuses sets, when the specific communication data is received while the signal line connected to the own sensor apparatus is determined to be in the disabled state, the node ID specified by the node ID set command as a node ID of the own sensor apparatus, and the electronic control apparatus attaches one of the node IDs assigned to the sensor apparatuses as address information to communication data to be transmitted to a corresponding one of the sensor apparatuses.

5. The control system according to claim 4, wherein each of the sensor apparatuses performs a state detecting operation to detect whether or not the signal line connected to the own sensor apparatus has been in the disabled state for a period longer than a predetermined time within a predetermined specific time period, and discards communication data received in the communication device if a result of the state detecting operation is affirmative.

6. The control system according to claim 5, wherein each of the sensor apparatuses performs the state detecting operation when the sensor apparatuses are started up.

7. The control system according to claim 5, wherein each of the sensor apparatuses does not accept communication data transmitted from the electronic control apparatus until the state detecting operation is completed.

8. The control system according to claim 5, wherein each of the sensor apparatuses is configured to set a specific ID showing presence of a fault as the node ID thereof if a result of the state detecting operation is affirmative.

9. The control system according to claim 5, wherein each of the sensor apparatuses is configured to discard the specific communication data containing the ID set command received form the electronic control apparatus if a result of the state detecting operation is affirmative.

10. A sensor apparatus having a communication function comprising:
a sensor;
a communication device to perform data communication with an external apparatus through a communication line;
an output circuit to transmit a sensor signal outputted from the sensor to the external apparatus through a signal line;
a determination means to determine whether the signal line is in a disabled state where the sensor signal is inhibited from being transmitted on the signal line or an enabled state where the sensor signal is allowed to be transmitted on the signal line; and
a reception control means configured to accept communication data received in the communication device when the signal line is determined to be in the disabled state by the determination means to perform an operation in accordance with the received communication data, and to discard the received communication data when the signal line is determined to be in the enabled state by the determination means;
wherein the reception control means performs a state detecting operation to detect whether or not signal line has been in the disabled state for a period longer than a predeterminded time within a predetermined specific time period, and discards communication data received in the communication device if a result of the state detecting operation is affirmative.

11. The sensor apparatus according to claim 10, wherein the reception control means performs the state detecting operation when the sensor apparatus is started up.

12. The sensor apparatus according to claim 10, wherein reception control means does not accept communication data transmitted from the electronic control apparatus until the state detecting operation is completed.

13. A control system comprising:
a plurality of sensor apparatuses each including a sensor, an output circuit connected to the sensor, and a communication device; and an electronic control apparatus to which the communication devices of the sensor apparatuses are connected through a common communication line to enable data communication between the electronic control unit and each of the sensor apparatuses, the electronic control apparatus being connected to signal lines respectively connected to the output circuits of the sensor apparatuses to enable receiving sensor signals respectively outputted from the sensor apparatuses, the electronic control apparatus including a transmission control means configured to, prior to transmitting communication data to one of the sensor apparatuses, set the signal lines connected to the other sensor apparatuses to which the communication data is not addressed in an enabled state in which the sensor signal is allowed to be transmitted, and set the signal line connected to the one of the sensor apparatus to which the communication data is addressed in a disabled state in which the sensor signal is inhibited from being transmitted, each of the sensor apparatuses including a determination means to determine whether or not the signal line connected to the own sensor apparatus is in the disabled state based on an operation state of the output circuit of the own sensor apparatus, and a reception control means configured to accept the communication data received in the communication device to perform an operation in accordance with the accepted communication data when the signal line connected to the own sensor apparatus is determined to be in the disabled state by the determination means, and discard the received communication data when the signal line connected to the own sensor apparatus is determined to be in the enabled state by the determination means, wherein the transmission control means is configured to successively select one of the sensor apparatuses as an object of a node ID assignment process performed by the electronic control apparatus for assigning node IDs to the respective sensor apparatuses, transmit specific communication data containing a node ID set command specifying a node ID to be assigned to the selected sensor apparatus while setting the signal line connected to the selected sensor apparatus in the disabled state, and setting the signal lines of the sensor apparatuses other than the selected sensor apparatus in the enabled state, the reception control means of each of the sensor apparatuses sets, when the specific communication data is received while the signal line connected to the own sensor apparatus is determined to be in the disabled state, the node ID specified by the node ID set command as a node ID of the own sensor apparatus, the electronic control apparatus attaches one of the node IDs assigned to the sensor apparatuses as address information to communication data to be transmitted to a corresponding one of the sensor apparatuses, and each of the sensor apparatuses performs a state detecting operation to detect whether or not the signal line connected to the own sensor apparatus has been in the disabled state for a period longer than a predetermined time within a predetermined specific time period, and discards communication data received in the communication device if a result of the state detecting operation is affirmative.

\* \* \* \* \*